United States Patent [19]

Kempf et al.

[11] 4,355,354
[45] Oct. 19, 1982

[54] INTERFACE APPARATUS FOR COUPLING A MINICOMPUTER TO A MICROCOMPUTER FOR THE TRANSFER OF DATA BETWEEN THEM AND METHOD FOR USING SAME

[75] Inventors: Mark F. Kempf, Glen Ellyn; D'Arcy C. Randall, Winfield; Timothy R. Walworth, Naperville, all of Ill.

[73] Assignee: Standard Oil Company (Indiana), Chicago, Ill.

[21] Appl. No.: 920,408

[22] Filed: Jun. 29, 1978

[51] Int. Cl.³ .............................................. G06F 3/00
[52] U.S. Cl. .................................................... 364/200
[58] Field of Search ... 364/200 MS File, 900 MS File; 340/147 R, 147 C, 147 LP

[56] References Cited

U.S. PATENT DOCUMENTS

| 3,886,524 | 5/1975 | Appelt | 364/200 |
| 3,909,790 | 9/1975 | Shapiro et al. | 364/200 |
| 3,921,148 | 11/1975 | Ophir et al. | 364/900 |
| 3,976,979 | 8/1976 | Parkinson et al. | 364/200 |
| 3,988,716 | 10/1976 | Fletcher et al. | 364/200 |
| 3,993,981 | 11/1976 | Cassarino, Jr. et al. | 364/200 |
| 4,007,449 | 2/1977 | Vercesi | 364/200 |
| 4,086,627 | 4/1978 | Bennett et al. | 364/200 |
| 4,106,091 | 8/1978 | Hepworth et al. | 364/200 |

*Primary Examiner*—Raulfe B. Zache
*Attorney, Agent, or Firm*—William T. McClain; William H. Magidson; Thomas R. Vigil

[57] ABSTRACT

Interface apparatus which facilitates asynchronous parallel transfer of data at a speed of up to at least 1.6 megabits per second between a minicomputer and a microcomputer. The apparatus includes a plurality of bidirectional data circuits parallel coupled between the minicomputer and the microcomputer for carrying data between the minicomputer and the microcomputer when either computer wants to send data to the other computer. The apparatus also includes data transfer control circuitry coupled between the minicomputer and the microcomputer for permitting either computer, when it wants to send data, to: (a) indicate by means of a first or second control signal to the receiving computer that the sending computer wants to transmit data over the data circuits, (b) resolve contention between the computers for access to the interface apparatus, (c) enable the receiving computer to indicate to the sending computer that the receiving computer is ready to receive data over the data circuits, (d) effect transfer of data from the sending computer to the receiving computer over the data circuits, and, (e) enable the receiving computer to indicate to the sending computer that the receiving computer has received the data.

11 Claims, 2 Drawing Figures

INTERFACE APPARATUS FOR COUPLING A MINICOMPUTER TO A MICROCOMPUTER FOR THE TRANSFER OF DATA BETWEEN THEM AND METHOD FOR USING SAME

BACKGROUND OF THE INVENTION

1. Field of the Invention

The field of the invention is interface apparatus coupled between a minicomputer and a microcomputer, for facilitating the transfer of data between the computers.

2. Description of the Prior Art

Heretofore various apparatus have been proposed and utilized for interfacing between computers and more specifically between minicomputers and microcomputers. One commonly used device is known by the Ser. No. RS232 and is an asynchronous interface device which provides for serial transfer of data between one computer and another computer. The asynchronous device can operate over virtually unlimited distances but is usually limited to a transfer rate of 9600 bits/second or less. Thus, although the RS232 can operate over unlimited distances, the transfer rate is rather slow. Such an interface device is described in a technical report dated August, 1969 issued by the Electronic Industries Association under the Ser. No. RS-232-C.

In applications where higher data transfer rates are required, a parallel interface apparatus can be utilized such as the so-called "INTEL$_{TM}$ Multibus", provided long distances are not involved.

According to the teachings of the present invention and as will be described in greater detail hereinafter, the interface apparatus of the present invention is usable for distances of up to at least 200 feet (61 meters) long conductors as opposed to short conductors of 1 ft (30 cm) or less while at the same time providing a transfer rate by means of parallel data lines which is essentially limited only by the speed of the direct memory access controller in the minicomputer and the speed of operation of the microcomputer. With the parallel data line interface apparatus of the present invention a transfer rate of 100,000 words per second, the equivalent of 1.6 megabits per second, is easily attained.

SUMMARY OF THE INVENTION

According to the invention there is provided an interface apparatus for facilitating asynchronous parallel transfer of data at a speed of up to at least 1.6 megabits per second between a minicomputer and a microcomputer, said apparatus comprising a plurality of bidirectional data circuits parallel coupled between the computers for carrying data between the computers when either computer wants to send data to the other, and data transfer control circuit means coupled between the computers for permitting either computer, when it wants to send data, to:

(a) indicate by means of a control signal to the receiving computer that the sending computer wants to transmit data over the data circuits, (b) resolve contention between the computers for access to the interface apparatus, (c) enable the receiving computer to indicate to the sending computer that the receiving computer is ready to receive data over the data circuits, (d) effect transfer of data from the sending computer to the receiving computer over the data circuits, and (e) enable the receiving computer to indicate to the sending computer that the receiving computer has received the data, said data transfer control means including:

(A) a first circuit means coupled between the computers for receiving a first control signal from the microcomputer indicating that it wants to send data, which first control signal, as transmitted by said first circuit means, is readable by the minicomputer, (B) second circuit means coupled between the computers for receiving a second control signal from the minicomputer indicating that it wants to send data, which second control signal, as transmitted by said second circuit means, is readable by the minicomputer, (C) bistable circuit means coupled between the computers, said bistable circuit means including a bistable multivibrator which has a set input and which is preset to supply a "no" signal to the microcomputer indicating that no data is ready to be transmitted, and upon receiving a strobe signal from the minicomputer, after the minicomputer has sensed that a first control signal is not present on said first circuit means and has then asserted a second control signal on said second circuit means and has presented data to said data circuits, then to provide a "yes" signal to the microcomputer indicating that data is ready to be transferred from the minicomputer to the microcomputer over said data circuits so that when the microcomputer reads the "yes" signal it can then input the data on said data circuits, (D) third circuit means coupled between the computers and to said bistable circuit means for carrying a reset signal from the microcomputer, indicating that it has input the data, to a reset input of said bistable multivibrator to reset same and to indicate to the minicomputer that the data has been received and input by the microcomputer, (E) fourth circuit means coupled between the computers for receiving a signal from the microcomputer and transmitting same to the minicomputer to indicate to the minicomputer that the microcomputer has data to send to the minicomputer, (F) fifth circuit means coupled between the computers for receiving a signal from the minicomputer indicating that the minicomputer is ready to receive data from the microcomputer and for transferring the signal to the microcomputer, and (G) AND circuit means coupled between the computers and to said first circuit means and operable to receive the first control signal from the microcomputer at one input thereof which is coupled to said first circuit means and to receive a strobe signal at another input thereof from the microcomputer indicating that the microcomputer is ready to transmit data and upon receiving both signals to send a signal to the minicomputer that the data is ready to be transferred from the microcomputer to the minicomputer over the data circuits.

DESCRIPTION OF THE PREFERRED EMBODIMENT

Figure 1:
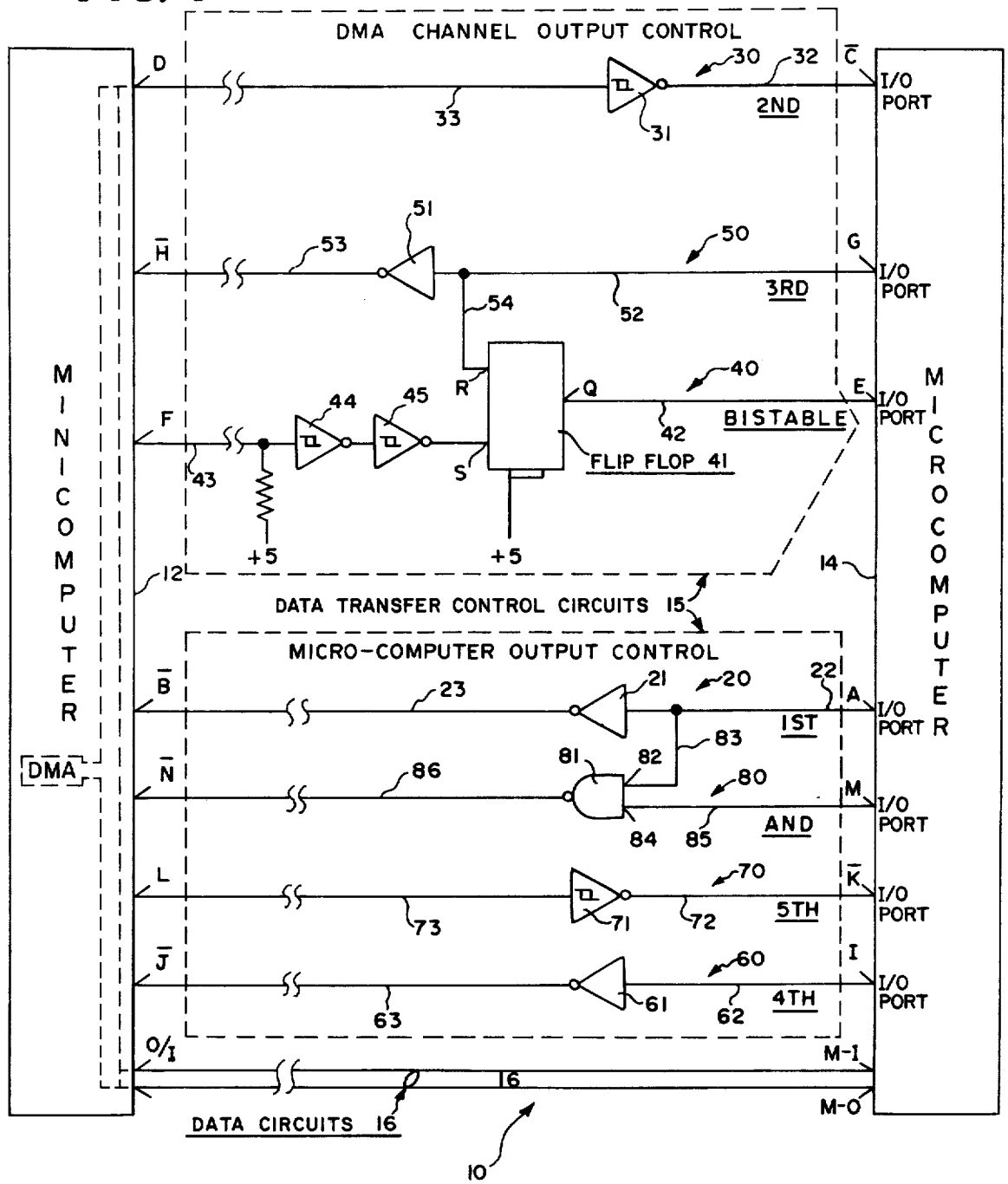
FIG. 1 is a block circut diagram of the interface apparatus of the present invention coupled between a minicomputer and a microcomputer.

Referring now to the drawings in greater detail there is illustrated in FIG. 1 the interface apparatus of the present invention which apparatus is generally identified by the reference numeral 10. The interface apparatus 10 is coupled between (a) the direct memory access (DMA) controller of a minicomputer 12 such as the 4805 controller in a MODCOMP$_{TM}$ 2 or 4 minicomputer manufactured by Modular Computer Systems, Inc. of Ft. Lauderdale, Fla. and (b) the input/output (I/O) ports of a microcomputer 14 such as the PCS 180 Computer manufactured by Process Computer Systems, Inc. of Saline, Mich.

As shown the interface apparatus 10 includes seven data transfer control circuits which are generally identified by reference numeral 15 and sixteen data circuits which are generally identified by the reference numeral 16 in FIG. 1.

The seven data transfer control circuits are described below:

One circuit is referred to herein as the first circuit 20 and includes an inverting amplifier 21 which can be realized by an inverting AND device having its inputs tied together, a short conductor 22 coupled between the input of the amplifier 21 and a MICRO IN SEND STATE port A of the microcomputer 14 and a long conductor 23 coupled between the output of the inverting amplifier 21 and a DMA INPUT STATUS BIT 15 terminal $\overline{B}$ of the microcomputer 12.

Another circuit is referred to herein as the second circuit 30 and includes a Schmitt Trigger inverting buffer amplifier 31, a short conductor 32 coupled between the output of the amplifier 31 and a MICRO IN RECEIVE STATE port $\overline{C}$ of the microcomputer 14 and a long conductor 33 coupled between the input of the amplifier 31 and a DMA OUTPUT DATA BIT 0-15 terminal D of the minicomputer 12.

Another circuit is referred to herein as a bistable circuit, is generally identified by the reference numeral 40 and includes a bistable multivibrator 41, a short conductor 42 coupled between an output Q of the bistable multivibrator and a MICRO DATA READY port $\overline{E}$ of the microcomputer 14, a long conductor 43 having two serially connected Schmitt Trigger buffer amplifiers 44 and 45 therein and being coupled between a set input S of the multivibrator 41 and DMA OUTPUT DATA STROBE terminal F of the minicomputer 12. The bistable multivibrator 41 can be realized by an RS flip flop or a D flip flop.

Another circuit is referred to herein as the third circuit, is generally identified by the reference numeral 50 and includes an inverting amplifier 51 which can be realized by an inverting AND device with its inputs tied together, a short conductor 52 coupled between the input of the inverting amplifier 51 and a MICRO DATA ACCEPT port G of the microcomputer 14, and a long conductor 53 coupled between the output of the inverting amplifier 51 and a DMA OUTPUT DATA ACCEPT terminal $\overline{H}$ of the minicomputer 12. Also there is a conductor 54 connecting the conductor 52 to a reset input R of the multivibrator 41.

The three data transfer control circuits identified as the second, third and bistable circuits 30, 50 and 40 respectively, can be referred to as the DMA channel output control circuits.

Another circuit is referred to herein as the fourth circuit, is generally identified by the reference numeral 60 and includes an inverting amplifier 61, a short conductor 62 coupled between the input of the amplifier 61 and a MICRO REQUEST port I of the microcomputer 14, and a long conductor 63 connected between the output of the amplifier 61 and a DMA EXTERNAL INTERRUPT terminal $\overline{J}$ of the minicomputer 12.

Another circuit is referred to herein as the fifth circuit, is generally identified by the reference numeral 70 and includes a Schmitt Trigger inverting buffer amplifier 71, a short conductor 72 coupled between the output of the amplifier 71 and a MICRO DATA ACCEPT port $\overline{K}$ of the microcomputer 14 and a long conductor 73 coupled between the input of the amplifier 71 and a DMA INPUT BUFFER EMPTY terminal L of the minicomputer 12.

Still another circuit of the data transfer control circuit is referred to as an AND circuit and is generally identified by the reference numeral 80. The AND circuit 80 includes an inverting AND device 81 having one input 82 coupled by a conductor 83 to the short conductor 22 of the first circuit 20 and a second input 84 coupled by a short conductor 85 to a MICRO OUTPUT DATA STROBE port M of the microcomputer 14. The AND circuit 80 also includes a long conductor 86 coupled between the output of the inverting AND device 81 and a DMA LOAD INPUT BUFFER terminal $\overline{N}$ of the minicomputer 12.

The first, AND, fifth and fourth circuits 20, 80, 70 and 60 respectively can be referred to as the microcomputer output control circuits.

Figure 2:
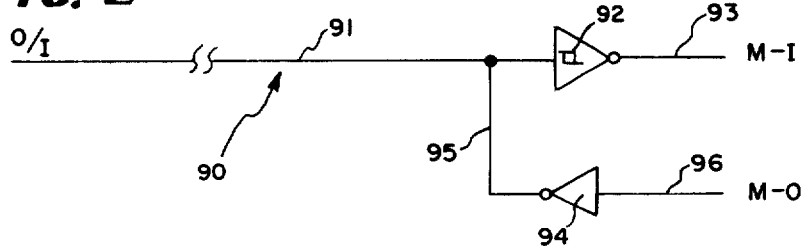
FIG. 2 is a schematic diagram of one of the data circuits utilized in the interface apparatus shown in FIG. 1.

In FIG. 2 there is illustrated one of the sixteen data circuits 16 which is generally identified therein by the reference numeral 90. The data circuit 90 includes a long conductor 91 which is connected at one end to one of the 0-15 DMA OUTPUT DATA BIT terminals or to one of the 0-15 DMA INPUT DATA BIT terminals of the minicomputer 12 and generally identified by the reference character O/I. The data circuit 90 further includes a Schmitt Trigger inverting buffer amplifier 92 having one input coupled to the conductor 91 and an output coupled by a short conductor 93 to one of 0-15 MICRO INPUT DATA BIT ports of the microcomputer 14 and generally identified by the reference character M-I. The data circuit 90 further includes an inverting amplifier 94 which can be realized by an inverting AND device having its inputs tied together and which has its output coupled by a conductor 95 to the long conductor 91 and an input coupled by a short conductor 96 to one of the MICRO OUTPUT DATA BIT 0-15 ports of the microcomputer 14 and generally identified by the reference character M-O.

Briefly summarizing the operation of the interface apparatus 10, data is transferred from the microcomputer 14 to the minicomputer 12 or vice versa via the 16 data circuits 16 which can be referred to as a 16 bit bidirectional data bus that is parallel coupled between the digital I/O ports of the microcomputer 12 and the terminals of the minicomputer's direct memory access (DMA) controller.

So-called hand-shaking signals are used to control the data transfers as will be described in greater detail below. Furthermore, additional signals notify one computer that the other is ready to send data and provides status signals which are used in contention arbitration to decide which computer should have access to the interface apparatus for the transfer of data when there is a simultaneous attempt by the computers to obtain access to the interface apparatus 10.

The operation of the interface apparatus 10 in the two opposing directions between the computers can be considered separately and is described in greater detail below.

The first transfer described below is the DMA controller transmission of data to the microcomputer.

When the microcomputer 12 has data to transmit to the microcomputer 14 the DMA controller must first gain access to, or control of, the interface apparatus 10. For this purpose computer program software logic in the minicomputer 12 first examines the logic state of the $\overline{B}$ terminal coupled to the first circuit 20. If the logic state at the $\overline{B}$ terminal is true this indicates that the microcomputer 14 is in control of the interface apparatus 10 and the minicomputer 12 must not proceed to take control until the logic state at the $\overline{B}$ terminal goes false. When the logic state of the $\overline{B}$ terminal is false, the minicomputer 12 asserts a signal level on the D terminal coupled to the second circuit 30 and immediately again examines the logic state of the $\overline{B}$ terminal connected to the first circuit 20. If the logic state at the $\overline{B}$ terminal is true that indicates that the microcomputer 14 had requested control of the interface apparatus 10 simultaneously and the minicomputer 12 must now reset the signal logic state on the D terminal, that is to say, it must take the signal level off the D terminal to the second circuit 30 and then allow the microcomputer 14 to assume control of the interface apparatus 10. However, if the $\overline{B}$ logic state at the $\overline{B}$ terminal is still false, the minicomputer 12 is now in control of the interface apparatus 10 and may proceed to transmit data.

Under the control of the minicomputer 12, the minicomputer 12 presents 16 bits of data on the data circuits 16 and supplies a strobe signal to the F terminal coupled to the bistable circuit 40. This signal is stabilized by the Schmitt Trigger buffer amplifiers 44 and 45 and a smooth control signal is then presented to the set S input of the bistable multivibrator 41 to change the signal level at the output Q of the multivibrator 41. This signal then appears at the E port of the microcomputer 14, the software logic of which periodically examines the logic state of the E port. When the microcomputer 14 reads the new logic state at the E port it then inputs the data and supplies a strobe signal to the G port, which strobe signal is supplied via the conductors 52 and 54 to the reset R input of the multivibrator 41 to reset the logic state at the output Q. The strobe signal is also supplied to the input of the inverting amplifier 51 to provide a signal to the $\overline{H}$ terminal of the minicomputer 12 to cause the DMA controller to go through another data transmission cycle and supply another 16 bits of data to the data circuits 16 and repeat the procedure described above. This procedure is repeated until all the data has been transferred. When the computer program software logic of the minicomputer 12 removes the signal level from the D terminal. At this point in time the data transfer from the minicomputer 12 to the microcomputer 14 is now completed and the interface apparatus 10 is idle and available to either computer.

The other data transfer is the microcomputer transmission of data to the minicomputer which is described below.

When the microcomputer 14 has data to transmit to the minicomputer 12, the microcomputer 14 also first gains control of, or access to, the interface apparatus 10. Computer program software logic of the microcomputer 14 first examines the logic state at the $\overline{C}$ port coupled to the second circuit 30. If the signal at the $\overline{C}$ port is true this indicates that the minicomputer 12 is in control of the interface apparatus 10 and the software logic of the microcomputer 14 knows that it must not proceed to attempt to take control of the interface apparatus 10 until the logic state at the $\overline{C}$ port goes false. When the logic state at the $\overline{C}$ port is fase the microcomputer 14 asserts a signal level on the A port coupled to the first circuit 20. This provides a true signal to the conductor 23 of the first circuit 20 which is coupled to the $\overline{B}$ terminal of the DMA controller. Since contention problems for access to, and control of, the interface apparatus 10 are resolved by the minicomputer 12, no further action is required by the microcomputer 14 to gain control of the interface apparatus 10. At this point, the computer program software logic of the microcomputer 14 supplies a strobe signal to the I port coupled to the fourth circuit 60 which is received at the $\overline{J}$ terminal of the minicomputer to cause the minicomputer to initiate a DMA input cycle.

This strobe signal at the $\overline{J}$ port indicates to the minicomputer 12 that the microcomputer 14 wants to send data to the minicomputer 12 and initiates a DMA input cycle. Each DMA cycle causes a strobe signal to be supplied to the L terminal coupled to the fifth circuit 70, which signal is received by the microcomputer 14 at the $\overline{K}$ port. This signal indicates to the microcomputer 14 that minicomputer 12 is ready to receive data. The microcomputer 14 recognizes this signal received at the $\overline{K}$ port coupled to the fifth circuit 70 and then outputs a 16 bit data word on the data circuits 16. Once the data has been placed on the data circuits 16, the microcomputer 14 supplies a strobe signal to the M port coupled to the input 84 of the inverting AND device 81. At the same time, of course, a signal level is being supplied from the A port via the conductor 22 and the conductor 83 to the input 82 of the inverting AND device 81. As a result when a strobe signal is received at the input 84, a signal is supplied from the output of the inverting AND device 81 over the conductor 86 to the $\overline{N}$ terminal of the minicomputer 12 telling the minicomputer 12 to accept data. The DMA controller then inputs the data into the minicomputer and initiates another DMA cycle. This process is repeated until all the data has been transmitted.

When all the data has been transmitted from the microcomputer 14 to the minicomputer 12, the microcomputer software logic ceases supplying the strobe signal to the I port coupled to the fourth circuit 60. The absence of this strobe signal indicates to the DMA controller that the microprocessor 14 has completed its transmission of data and that the DMA controller should terminate the DMA input cycles. Then the software logic of the microprocessor 14 removes the signal level from (resets the signal level at) the A port coupled to the first circuit 20. In this way, the microcomputer 14 gives up control of the interface apparatus 10 and readies the same for use by either computer.

From the foregoing description of the preferred embodiment of the interface apparatus 10 of the present invention it will be apparent that such apparatus 10 has a number of advantages, some of which have been described above and others of which are inherent in the invention. For example:

(1) The interface apparatus 10 can be coupled between a data collection device and a computer device without requiring the computer device to have a special program built into its overall program for transmitting data between the devices. This means that the size of the computer program can be reduced and all that is needed is a simple protocol for the DMA input cycle. This further means that any breakdown in the computer program will not affect the microcomputer 14.

(2) Another advantage is that the interface apparatus 10 and the microprocessor 14 or other collection device are independent of the computer and not computer dependent. Thus the minicomputer could be disconnected from the apparatus 10 without affecting the microprocessor 14 and the microprocessor 14 can be disconnected from the interface apparatus 10 and minicomputer computer 12 without affecting the operation of the minicomputer 12.

(3) Also, the interface apparatus 10 is not limited by the computer connections and can be used with any type of data collection device or other computer device.

(4) A further advantage is that the circuit elements are very simple comprising seven data transfer control circuits and sixteen data circuits. Because of its simplicity and minimum of components the interface apparatus 10 is very dependable.

(5) Still another advantage is that with parallel transfer of data on the sixteen bidirectional data circuits parallel coupled between the computers, a very rapid transfer of data can be achieved which is roughly up to 120,000 data words per second.

(6) A further advantage is that with the choice, arrangement and connection of the various circuit components of the interface apparatus 10 a relatively long interface connection can be made of up to approximately 200 ft. (61 meters). In this respect, it will be understood that the circuit elements in the various data transfer control circuits are situated adjacent the ends of the circuits coupled to the microcomputer 14 and that the long conductor lines extend between these circuit elements and the minicomputer 12.

Also, the interface apparatus 10 has a number of uses. For example:

(1) The interface apparatus 10 can be utilized with a plurality of dedicated microcomputer or data collection devices which have a program burned into the circuits thereof so that it is dedicated to performing only one function in process control or data acquisition. Such dedicated devices can then be easily connected or disconnected to a computer device such as a minicomputer by means of the interface apparatus 10. The process control and data acquisition could be in field operations or in a laboratory environment.

(2) The interface apparatus 10 can be utilized as a data formatter for graphic display terminals. In this respect the microcomputer 14 can be programmed to operate a plotter and/or cathode ray tube display device and the minicomputer 12 can be coupled to the microcomputer by means of the interface apparatus 10 for the purpose of displaying data on the plotter and/or cathode ray tube or for receiving data plotted on the plotter.

(3) The interface apparatus 10 can be used to perform message switching functions in a computer distributed processing system or network system. In this use, a minicomputer can be used to collect data from a process control apparatus such as in a gas chromatography system. Then the minicomputer can be coupled by the interface apparatus 10 to a microcomputer controller which is also connected to a digital bus. The digital bus has other similar computer/interface/controller systems connected thereto such as a minicomputer which is connected to a printer and CRT or to peripheral data storage discs and which also is connected by a similar interface apparatus 10 to a microcomputer controller which is connected to the digital bus. Each of the interface apparatus 10 utilized in such an overall system is able to effect rapid transfer of data between the minicomputer and the data bus which effects transfer of the data to another minicomputer. In such a system, the operating program for the minicomputer is kept to a minimum and all it has to do is tell the microcomputer controller that it has data to send or that it is willing to receive data. The hand-shaking to set up a connection between another minicomputer and the resolution of contention problems when more than one minicomputer wants to transfer data are resolved by the microcomputer controllers together with the interface apparatus 10. Such a system is disclosed in copending application Ser. No. 920,409 filed on June 29, 1978 and entitled: Digital Bus and Control Circuitry for Data Routing and Transmission.

Further from the foregoing description of the construction, operation, advantages and uses of the interface apparatus 10 of the present invention it will be apparent that modifications and variations can be made thereto without departing from the teachings of the invention. Accordingly, the scope of the invention is only to be limited as necessitated by the accompanying claims.

We claim:

1. Interface apparatus for facilitating asynchronous parallel transfer of data at a speed of up to at least 1.6 megabits per second between a minicomputer and a microcomputer, said apparatus comprising a plurality of bidirectional data circuits parallel coupled between the computers for carrying data between the computers when either computer wants to send data to the other, and data transfer control circuit means coupled between the computers for permitting either computer, when it wants to send data, to:

(a) indicate by means of a control signal to the receiving computer that the sending computer wants to transmit data over the data circuits, (b) resolve contention between the computers for access to the interface apparatus, (c) enable the receiving computer to indicate to the sending computer that the receiving computer is ready to receive data over the data circuits, (d) effect transfer of data from the sending computer to the receiving computer over the data circuits, and (e) enable the receiving computer to indicate to the sending computer that the receiving computer has received the data, said data transfer control means including:

(A) a first circuit means coupled between the computers for receiving a first control signal from the microcomputer indicating that it wants to send data, which first control signal, as transmitted by said first circuit means, is readable by the minicomputer, (B) second circuit means coupled between the computers for receiving a second control signal from the minicomputer indicating that it wants to send data, which second control signal, as transmitted by said second circuit means, is readable by the microcomputer, (C) bistable circuit means coupled between the computers, said bistable circuit means including a bistable multivibrator which has a set input and which is preset to supply a "no" signal to the microcomputer indicating that no data is ready to be transmitted and, upon receiving a strobe signal from the minicomputer after the minicomputer has sensed that a first control signal is not present on said first circuit means and has then asserted a second control signal on said second circuit means and has presented data to said data circuits, then to provide a "yes" signal to the microcomputer indicating that data is ready to be transferred from the minicomputer to the microcomputer over said data circuits so that when the microcomputer reads the "yes" signal it can then input the data on said data circuits, (D) third circuit means coupled between the computers and to said bistable circuit means for carrying a reset signal from the microcomputer, indicating that it has input the data, to a reset input of said bistable multivibrator to reset same and to indicate to the minicomputer that the data has been received and input by the microcomputer, (E) fourth circuit means coupled between the computers for receiving a signal from the microcomputer and transmitting same to the minicomputer to indicate to the minicomputer that the microcomputer has data to send to the minicomputer, (F) fifth circuit means coupled between the computers and receiving a signal from the minicomputer indicating that the minicomputer is ready to receive data from the microcomputer and for transferring the signal to the microcomputer, and (G) AND circuit means coupled between computers and to said first circuit means and operable to receive the first control signal from the microcomputer at one input thereof which is coupled to said first circuit means and to receive a strobe signal at another input thereof from the microcomputer indicating that the microcomputer is ready to transmit data and upon receiving both signals to send a signal to the minicomputer that the data is ready to be transferred from the microcomputer to the minicomputer over the data circuits.

2. The interface apparatus according to claim 1 wherein said first circuit means include an inverting amplifier having an input coupled to an I/O port of the microcomputer and an output coupled to an I/O port of the minicomputer.

3. The interface apparatus according to claim 1 wherein said second circuit means include a buffer amplifier having an input coupled to an I/O port of the minicomputer and an output coupled to an I/O port of the microcomputer.

4. The interface apparatus according to claim 1 wherein the bistable circuit means include a buffer amplifier having an input coupled to an I/O port of the minicomputer and an output coupled to said set input of said bistable multivibrator.

5. The interface apparatus according to claim 1 wherein said third circuit means include an inverting amplifier having an input coupled to an I/O port of the microcomputer and an output coupled to an I/O port of the minicomputer.

6. The interface apparatus according to claim 1 wherein said fourth circuit means includes an inverting amplifier having an input coupled to an I/O port of the microcomputer and an output coupled to an I/O port of the minicomputer.

7. The interface apparatus according to claim 1 wherein said fifth circuit means include an inverting buffer amplifier having an input coupled to an I/O port of the minicomputer and an output coupled to an I/O port of the microcomputer.

8. The interface apparatus according to claim 1 wherein each data circuit includes an inverting buffer amplifier having an input coupled to the minicomputer and an output coupled to the microcomputer.

9. The interface apparatus according to claim 8 wherein each data circuit further includes an inverting amplifier having its output connected to the input of said inverting buffer amplifier and its input coupled to the microcomputer.

10. The interface apparatus according to claim 1 wherein the plurality of data circuits comprises 16 data circuits.

11. The interface apparatus according to claim 1 wherein said data circuits and said first, second, third, fourth, fifth, AND and bistable circuit means of said data transfer control circuit means each include conductive means having a length of up to approximately 200 feet (61 m) in length for coupling the two computers located up to approximately 200 feet (61 m) apart.

* * * * *